United States Patent
Beranek

(10) Patent No.: US 6,886,013 B1
(45) Date of Patent: *Apr. 26, 2005

(54) HTTP CACHING PROXY TO FILTER AND CONTROL DISPLAY OF DATA IN A WEB BROWSER

(75) Inventor: Michael J. Beranek, Austin, TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1060 days.

(21) Appl. No.: 08/927,660

(22) Filed: Sep. 11, 1997

(51) Int. Cl.[7] .............................................. G06F 17/30
(52) U.S. Cl. ....................... 707/10; 707/3; 707/513; 707/522; 715/513; 715/522; 715/854
(58) Field of Search ..................... 395/200.57, 200.33, 395/200.47; 345/507, 334, 349, 118; 707/500, 3, 10, 522, 513; 709/247; 715/513, 522, 854

(56) References Cited

U.S. PATENT DOCUMENTS

| 4,586,158 | A |   | 4/1986 | Brandle ....................... 345/334 |
| 5,196,838 | A |   | 3/1993 | Meier et al. ................. 345/118 |
| 5,598,188 | A |   | 1/1997 | Gove et al. .................. 345/507 |
| 5,602,997 | A |   | 2/1997 | Carpenter et al. ........... 345/349 |
| 5,774,670 | A | * | 6/1998 | Montulli ................. 395/200.57 |
| 5,867,651 | A | * | 2/1999 | Dan et al. .............. 395/200.33 |
| 5,918,013 | A | * | 6/1999 | Mighdoll et al. ...... 395/200.47 |
| 6,012,071 | A | * | 1/2000 | Krishna et al. ............. 715/522 |
| 6,034,689 | A | * | 3/2000 | White et al. ................. 715/854 |
| 6,065,024 | A | * | 5/2000 | Renshaw .................... 715/513 |

FOREIGN PATENT DOCUMENTS

WO        9817064        4/1998

OTHER PUBLICATIONS

Hakon Wium Lie et al., "Cascading Style sheets, level 1", W3C Recommendation Dec. 17, 1996, pp. 1–18.*
Mark Brown, "Using Netscape 2", Que Corporation, 1995, pp. 647–701.*
Bickmore et al., (www.fxpal.xerox.com/papers/bic97), Digestor: Device–Independent Access to the World Wide Web, Oct. 8, 1998, pp. 1–8.

* cited by examiner

Primary Examiner—Thuy N. Pardo
(74) Attorney, Agent, or Firm—Jeffrey S. LaBaw; Joseph R. Burwell; David Judson

(57) ABSTRACT

A method of controlling how a Web document is presented for display on a browser of a client machine. The Web document typically is formatted according to a markup language such as HTML. The method uses a client side HTTP caching proxy to intercept the Web document and then dynamically rewrite the document before it is displayed on the browser. In particular, as the Web document is received from the server, the HTML is parsed to identify the format of the document and the information therein. A filter mechanism is then used to reformat the Web document according to some given protocol, and the re-formatted Web document is then passed to the browser for display. Dynamic alteration of the HTML in this manner enables control of the "look and feel" of the browser display.

31 Claims, 7 Drawing Sheets

HTTP CACHING PROXY TO FILTER AND CONTROL DISPLAY OF DATA IN A WEB BROWSER

BACKGROUND OF THE INVENTION

1. Technical Field

The present invention relates generally to computer network communications and, more particularly, to controlling the display of information on a Web browser via a client side proxy.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and receives in return a document formatted according to HTML.

There has been great interest in providing Internet access at minimal economic cost. While most computers now are pre-configured for Internet access, a significant percentage of households still do not have a personal computer. Thus, it has now been proposed to provide a data processing system that, much like a VCR, may be connected to a television set and used in lieu of a personal computer to provide Web access through a conventional remote control device associated with the system unit. Such a system enables the television to become, in effect, a "Web" appliance. The viewer can rapidly switch between conventional television and Internet access using the remote control unit. All of the conventional "Internet" access tools and navigational functions are preferably "built-in" to the system and thus hidden to the user.

Web page authors design their Web content using standard design constraints and HTML formatting constructs. Nevertheless, it is quite often the case that a given Web page looks different when viewed on different client machines, e.g., a workstation computer running Netscape Navigator™ and a personal computer connected to America OnLine™ and running an AOL-supplied browser. As a result of the differences between browser applications, web designers must often design multiple versions of the same or similar content in order to attempt to maintain consistent content display across different browser types. As a corollary, these multiple Web page versions must then be supported on a given server, and this results in slower page access time and often redundant or wasted Web site storage capacity.

The problem of presenting Web content in a consistent manner across multiple display system formats is exacerbated as more and more machines (such as conventional television-based systems) are provided with the capability of displaying such content. Therefore, although the goal of providing a simple-to-use and inexpensive Web "appliance" is laudable, existing techniques and display methods do not address this problem.

It would be highly desirable to provide a mechanism for processing a Web document such as is retrieved from a Web server in order to modify its display characteristics in a dynamic manner before delivery to the browser. Such a mechanism would have particular utility in that it would obviate generation and storage of multiple versions of a particular Web page yet ensure that the page is displayed consistently across multiple Web content display system types.

SUMMARY OF THE INVENTION

It is thus a primary goal of the present invention to dynamically control how information is presented on a browser of a client machine.

It is a more particular object of the invention to intercept and re-format a Web document prior to its display on a browser.

It is a more general object of this invention to enable Web content modification at a client machine such that an author of such content need only create a single version of the page.

It is still another object of this invention to provide a mechanism for modifying Web content, preferably prior to its delivery to and display by a browser, to thereby mask differences that would otherwise exist when the content is displayed across different types of display systems including, without limitation, a personal computer, a Web appliance, or the like.

It is a further object of this invention to use a HTTP caching proxy in conjunction with a browser to dynamically rewrite data received at the client from a Web server before that data is presented on the browser.

It is a more general object of this invention modify the "look and feel" of a Web page from the client side of a Web connection.

A still further object of this invention is to implement a "dynamic HTML" function in a standalone Web appliance or system to thereby modify the appearance of a Web document prior to its display on the browser.

It is a more specific object of the invention to enhance the operation of a browser cache by using a local proxy to dynamically re-format information received from a Web server.

It is still another object of the invention to provide a Web appliance or system with enhanced display presentation capability through use of a client-side proxy.

Another specific object of this invention is to provide a discovery mechanism for use with a client machine in which the client may discover the characteristics of the various display components used by the machine and then re-format Web content accordingly to enhance the "look and feel" of such content as a result of the discovered characteristics.

In accordance with the invention, a client computer, for example, a Web appliance, is connectable to the Internet and comprises a processor having an operating system, a browser application run by the operating system, a cache, and a proxy. The proxy includes means for intercepting and re-formatting a Web document in order to control how the Web document appears on the browser. The proxy modifies the "look and feel" of the Web document.

In the preferred embodiment, a method of controlling how a Web document is presented for display on a browser of a client machine uses a client side caching proxy. The Web document typically is formatted according to a markup language such as Hypertext Markup Language or "HTML." The method uses the client side HTTP caching proxy to intercept the Web document and then dynamically rewrite the document before it is displayed on the browser. In particular, as the Web document is received from the server, the HTML is parsed to identify the format of the document and the information therein. A filter mechanism is then used to re-format the Web document according to some given protocol or filter property, and the re-formatted Web document is then passed to the browser for display. Thus, for example, the filter may adjust or modify foreground/background colors, override font types and size, control display geometry (e.g., by reserving some dedicated display area), change URLs or display other URLs, embed files, add, remove or reconfigure frames, or control text and table formats. Dynamic alteration of the HTML in this manner enables control of the "look and feel" of the browser display.

In a preferred embodiment, the dynamic HTML function may be controlled automatically (e.g., by a service provider controlling the provision of content to the Web appliance) or by the user (by entering commands via an input device).

According to a more specific embodiment of the invention, there is described a method of controlling presentation on a given machine of a Web document formatted according to a markup language and normally supported on a server. The machine includes a Web browser. The browser has an associated display area normally used to display Web content. The method begins as a data stream including the Web document is received from a server. This stream is intercepted and parsed prior to its delivery to the browser to identify formatting information in the Web document. Thereafter, control information is inserted into the data stream such that, when the Web document is displayed on the browser, a portion of the display area is reserved for display of given content. The Web document, together with the control information, are then forwarded to the browser. The browser is then used to display the Web document on the display area. The control information preferably inhibits display of the Web document in the reserved display area. In this technique, the Web document, in effect, is re-flowed around the reserved area, thereby making space available for display of other content such as emergency messages, status messages, advertising, other pages, and the like.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description of the Preferred Embodiment taken in connection with the accompanying drawings in which.

DETAILED DESCRIPTION OF THE PREFERRED EMBODIMENT

Figure 1:
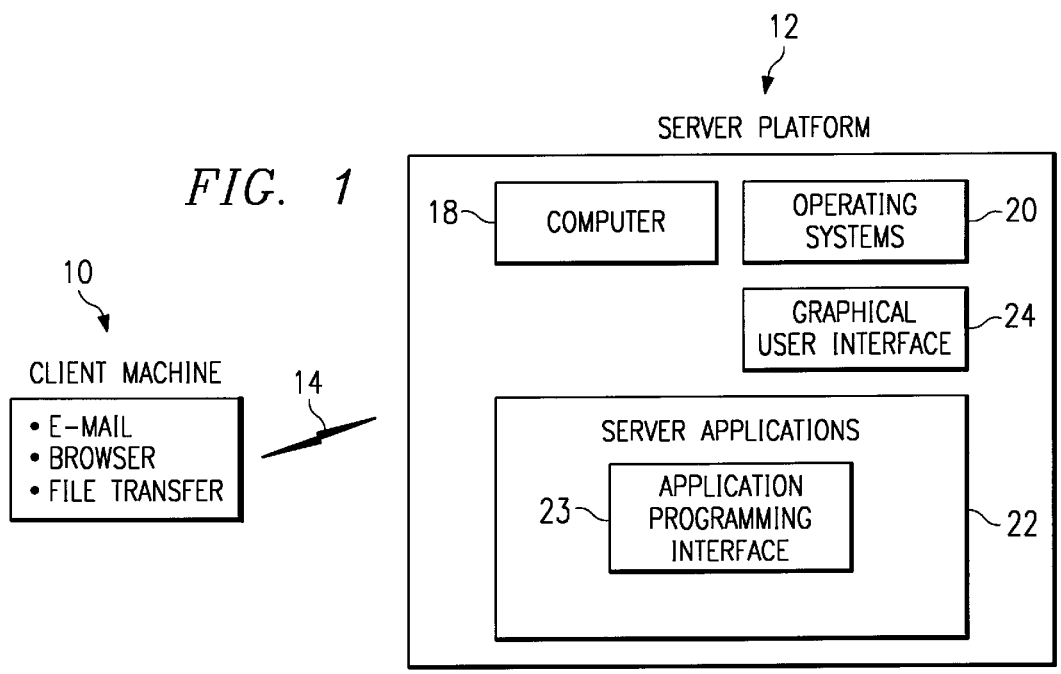
FIG. 1 is a representative system in which the present invention is implemented.

A representative system in which the present invention is implemented is illustrated in FIG. 1. An Internet client machine 10 is connected to a server platform 12 via a communication channel 14. For illustrative purposes, channel 14 is the Internet, an Intranet or other known connection. In the case of the Internet, server platform 12 is one of a plurality of servers which are accessible by clients, one of which is illustrated by machine 10. A client machine typically includes a suite of known Internet tools 16 to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system.

By way of example only, a client machine is a personal computer such as a desktop of notebook computer, e.g., an IBM® or IBM-compatible machine running under the OS/2® operating system, an IBM ThinkPad® machine, or some other Intelx86 or Pentium®-based computer running Windows 3.1 or greater operating system. A representative server platform 12 comprises an IBM RISC System/6000 computer 18 (a reduced instruction set of so-called RISC-based workstation) running the AIX (Advanced Interactive Executive Version 4.1 and above) Operating System 20 and Server program(s) 22. The platform 12 also includes a graphical user interface (GUI) 24 for management and administration. It may also include an application programming interface (API) 23. HTTP GET requests are transferred from the client machine to the server platform, typically via a dial-up computer network, to obtain documents or objects formatted according to HTML or some other markup language. The various models of the RISC-based computers are described in many publications of the IBM Corporation, for example, *RISC System/6000, 7013 and 7016 POWERstation and POWERserver Hardware Technical Reference*, Order No. SA23-2644-00. AIX OS is described in *AIX Operating System Technical Reference*, published by IBM Corporation, First Edition (November 1985), and other publications. While the above platform is useful, any other suitable hardware/operating system/server combinations may be used.

Figure 2A:
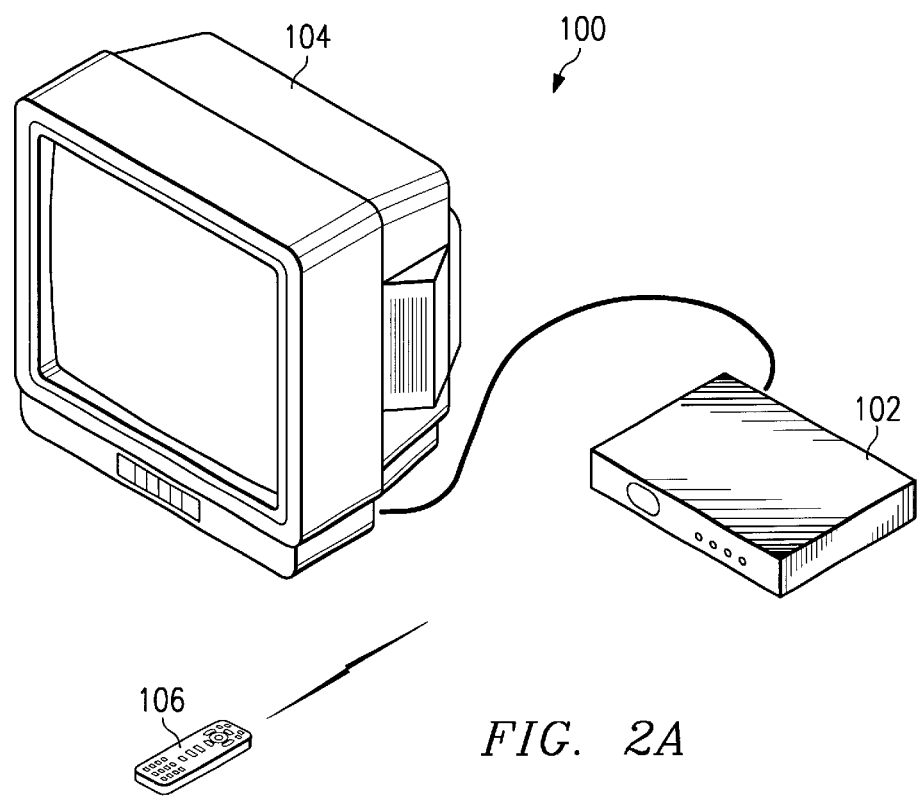
FIG. 2A is pictorial representation of a data processing system unit connected to a conventional television set to form a "Web" appliance.

Alternatively, the Internet client may be a data processing system or a so-called "Web appliance" such as illustrated in FIGS. 2A–2D and 3. FIG. 2A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, which is conventionally found in personal computers, to enable a user to "browse" the Internet. Additionally, data processing unit 102 may provide other common functions such as serving as an answering machine or receiving facsimile transmissions.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device (such as a mouse, glidepoint, trackball or the like) in conventional personal computers, including the ability to move a cursor on a display and select items.

Figure 2B:
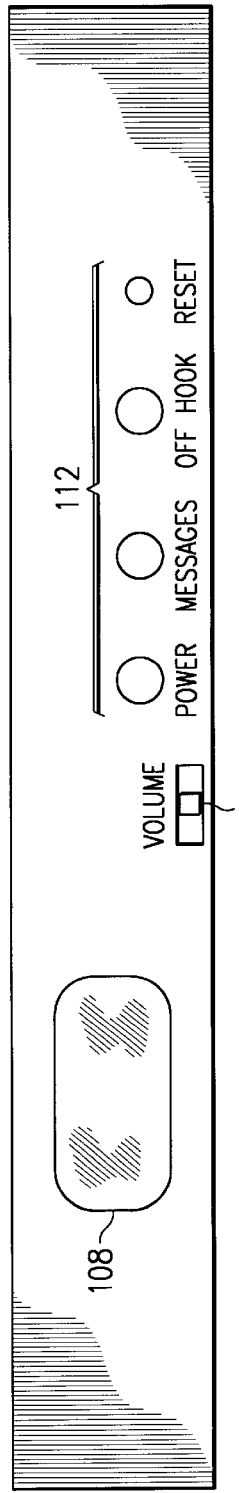
FIG. 2B is a pictorial representation of a front panel of the data processing system unit.

FIG. 2B is a pictorial representation of the front panel of data processing unit 102. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104 and other infrared remote controlled devices. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 2C:
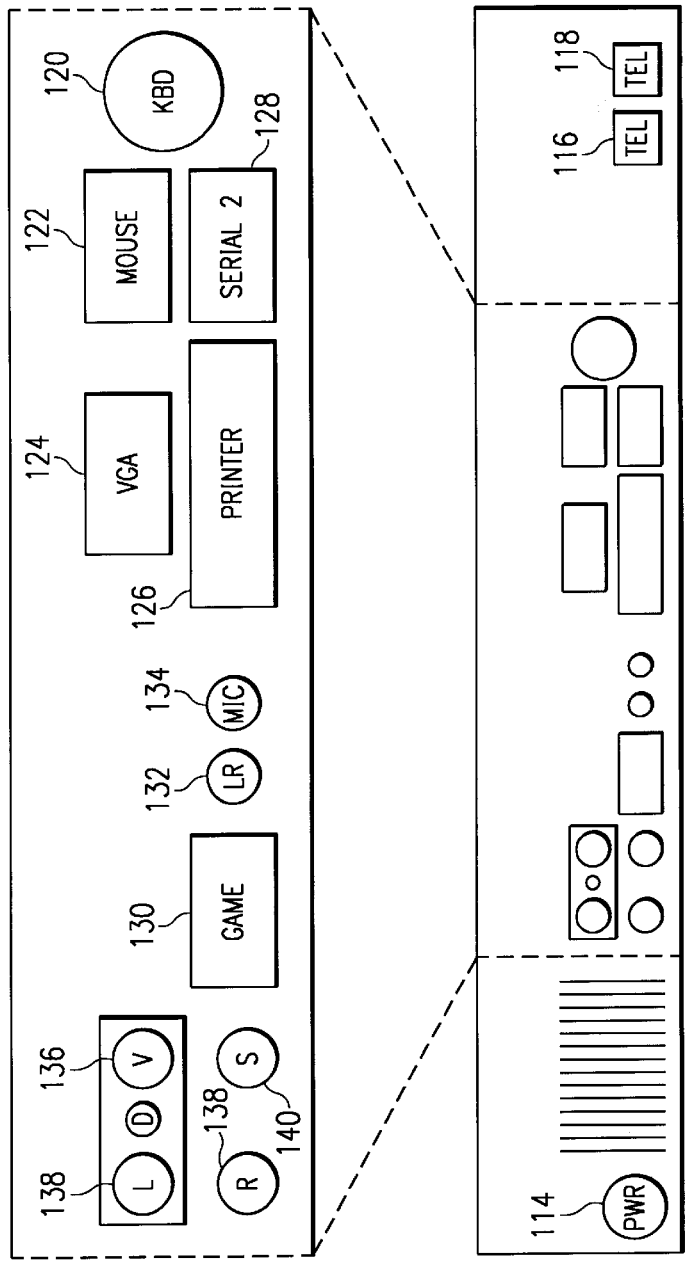
FIG. 2C is a pictorial representation of a rear panel of the data processing system unit.

FIG. 2C is a pictorial representation of the rear panel of data processing unit 102. A three wire (ground included) insulated power cord 114 passes through the rear panel. Standard telephone jacks 116 and 118 on the rear panel provide an input to a modem from the phone line and an output to a handset (not shown). The real panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel 3/4 modulator (not shown) may be connected in-line with the antenna connection.

Figure 2D:
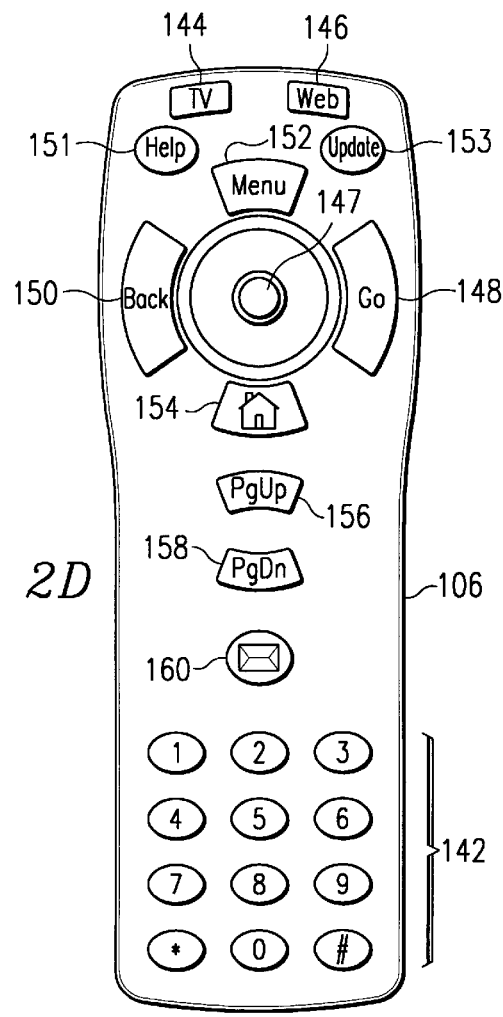
FIG. 2D is a pictorial representation of a remote control unit associated with the data processing system unit.

FIG. 2D is a pictorial representation of remote control unit 106. Similar to a standard telephone keypad, remote control unit 106 includes buttons 142 for Arabic numerals 0 through 9, the asterisk or "star" symbol (*) and the pound sign (#). Remote control unit also includes "TV" button 144 for selectively viewing television broadcasts and "Web" button 146 for initiating "browsing" of the Internet. Pressing "Web" button 146 will cause data processing unit 102 to initiate modem dial-up of the user's Internet service provider and display the start-up screen for an Internet browser.

A pointing device 147, which is preferably a trackpoint or "button" pointing device, is included on remote control unit 106 and allows a user to manipulate a cursor on the display of television 104. "Go" and "Back"buttons 148 and 150, respectively, allow a user to select an option or return to a previous selection. "Help" button 151 causes context-sensitive help to be displayed or otherwise provided. "Menu" button 152 causes a context-sensitive menu of options to be displayed, and "Update" button 153 will update the options displayed based on the user's input, while home button 154 allows the user to return to a default display of options. "PgUp" and "PgDn" buttons 156 and 158 allows the user to change the context of the display in display-sized blocks rather than by scrolling. The message button 160 allows the user to retrieve messages.

In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 3:
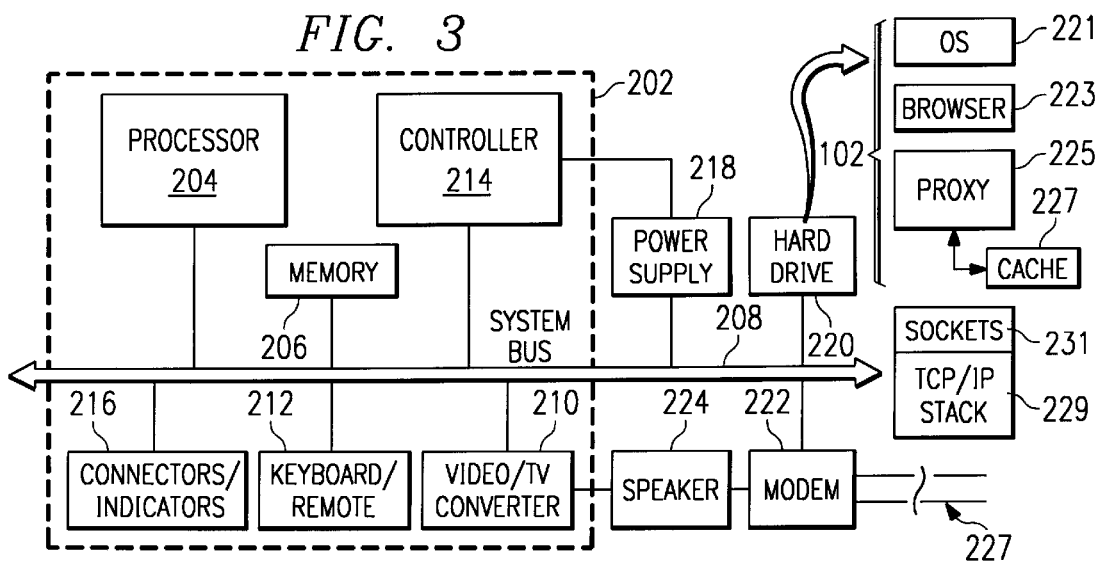
FIG. 3 is a block diagram of the major components of the data processing system unit.

Referring now to FIG. 3, a block diagram for the major components of data processing unit 102 is portrayed. As with conventional personal computers, data processing unit 102 includes a motherboard 202 containing a processor 204 and memory 206 connected to system bus 280. Processor 205 is preferably at least a 486 class processor operating at or above 100 MHz. Memory 206 may include cache memory and/or video RAM. Processor 205, memory 206, and system bus 208 operate in the same manner as corresponding components in a conventional data processing system.

Video/TV converter 210, located on motherboard 202 and connected to system bus 208, generates computer video signals for computer monitors, a composite television signal, and an S-Video signal. The functionality of Video/TV converter 210 may be achieved through a Trident TVG9685 video chip in conjunction with an Analog Devices AD722 converter chip. Video/TV converter 210 may require loading of special operating system device drivers.

Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the function provided by an infrared keyboard.

Connectors/indicators 216 on motherboard 202 provide some of the connections and indicators on data processing unit 102 described above. Other connections are associated with and found on other components. For example, telephone jacks 116 and 118 are located on modem 222. The power indicator within connectors/indicators 216 is controlled by controller 214.

External to motherboard 202 in the depicted example are power supply 218, hard drive 220, modem 222 and speaker 224. Power supply 218 is a conventional power supply except that it receives a control signal from controller 214 which effects shut down of all power to motherboard 202, hard drive 220 and modem 222. In some recovery situations, removing power and rebooting is the only guaranteed method of resetting all of these devices to a known state. Thus, power supply 218, in response to a signal from controller 214, is capable of powering down and restarting data processing unit 102.

Controller 214 is preferably one or more of the 805x family controllers. Controller 214 receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use. As part of the failure recovery system, controller 214 specifies the boot sector selection during any power off-on cycle.

Hard drive 220 contains operating system and applications software for data processing unit 102, which preferably includes IBM DOS 7.0, a product of International Business Machines Corporation in Armonk, New York; an operating system 221 such as Windows 3.1 (or higher), a product of Microsoft Corporation in Redmond, Washington; and a browser 223 such as Netscape Navigator (Version 1.0 or higher), a product of Netscape Communications Corporation in Mountain View, Calif. Hard drive 220 may also support an SMTP mechanism to provide electronic mail, an FTP mechanism to facilitate file transfers from Internet FTP sites, and other Internet protocol mechanisms, all in a known manner. Of course, the software identified above is merely representative, as other known programs may be used in the alternative or by way of addition. Also, minor modifications of these software packages may be desirable to optimize performance of data processing unit 102.

Modem 222 may be any suitable modem used in conventional data processing systems, but is preferably a 33.6 kbps modem supporting the V.42bis, V.34, V.17 Fax, MNP 1–5, and AT command sets. To maintain the slim height of data processing system 102, modem 222 is preferably inserted into a slot mounted sideways on motherboard 202. Modem 222 is connected to a physical communication link 227, which, in turn, in connected or connectable to the Internet (not shown).

Those skilled in the art will recognize that the components depicted in FIGS. 2A–2D and 3 and described above may be varied for specific applications or embodiments. Such variations in which the present invention may be implemented are considered to be within the spirit and scope of the present invention.

According to the invention, the client machine (typically the hard drive 220) also includes a proxy 225. Preferably, the proxy is implemented in software and includes a cache 227 associated therewith. The cache may be integral to the proxy or logically associated therewith. The cache preferably has a size up to several hundred megabytes, which is substantially larger than the standard cache associated with a browser such as Netscape Navigator. The client machine also includes a protocol stack 229 (e.g., a TCP/IP protocol stack) and a sockets mechanism 231, which are used to support communications in a known manner. According to the invention, the proxy 225 is advantageously located on the client along with the browser. Thus, the proxy is sometimes referred to as a "client side" proxy.

According to the present invention, the proxy 225 intercepts a Web document as it is received from the computer network and processes this document in order to control how the document is then presented on the browser. This enables the proxy to dynamically adjust the "look and feel" of a given Web document at the client side of the connection, irrespective of how the Web document is formatted and supported on the Web server. In one illustrative application, a Web document (or generically, any hypertext object) is reformatted upon a given occurrence, such as when it may be necessary to inform the user of some message (e.g., a weather alert, an emergency message, or the like). In the preferred embodiment as described below, the "look and feel" of the Web document is changed by adding, deleting, supplementing or otherwise rewriting HTML formatting data (otherwise known as "tags") of the document retrieved from the Web server prior to display of the document on the browser. Thus, the proxy implements "dynamic HTML" processing or "filtering" of the Web document.

Figure 4:
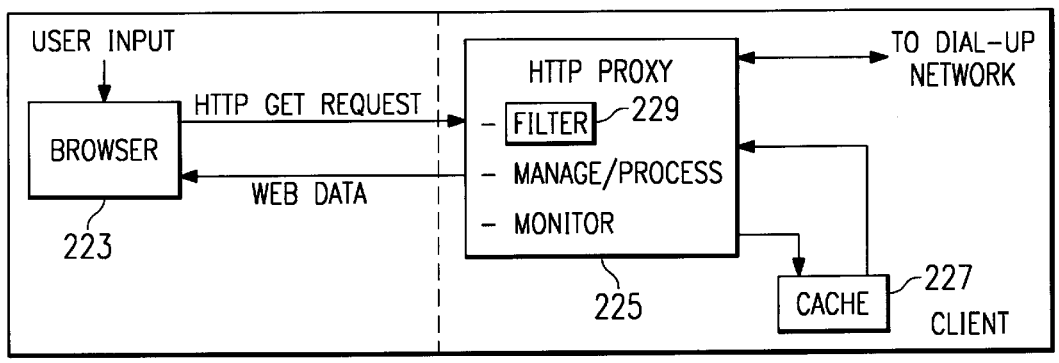
FIG. 4 is a block diagram of a client side proxy and its associated cache implemented in the Web appliance of FIG. 2A.

This operation is illustrated in the block diagram of FIG. 4. As seen in this diagram, the proxy comprises the memory cache 227 (and optionally the disk cache 234). In the preferred embodiment, as illustrated in FIG. 4, the proxy 225 is an HTTP caching proxy. An HTTP proxy is preferably designed to comply with Request For Comment (RFC) 2068, which is incorporated herein by reference. The proxy interfaces to the browser 221 to facilitate control over the "look and feel" of the browser interface by processing data returned from the network or from the cache 227. The processing of network-retrieved data is effected using a filter mechanism 229, as will be described in detail below.

Although not part of the present invention, the proxy 225 also facilitates the implementation of a more robust and efficient cache 227. When the client issues an HTTP GET request, the proxy services the request on behalf of the browser 223. This operation may be effected without the browser being aware that the service is being handled locally.

A particular operation of the filter mechanism 229 of the proxy 225 is to re-format a retrieved HTML document before that document is presented on the browser. By way of brief background, Hypertext Markup Language (HTML) uses tags and/or tag sets, each denoted by the <> symbols (replaced herein with braces "{ }" for electronic publishing purposes), to control presentation of information on a Web page. Thus, for example, all HTML documents must begin with the {HTML} tag and close with the {/HTML} tag. Header information, such as the title of the document, is contained within the {HEAD} and {/HEAD} tag set. The body of the document is formatted according to the {BODY} and {/BODY} tags. Thus, for example, to control the background color of the page, the {BODY} tag includes an attribute "BGCOLOR value" (e.g., {BODY BGCOLOR= "#FEAD00"}) expressed as a hexadecimal equivalent of an RGB value. Header tags {H} and {/H} control presentation of headers, as well as their relative size on the page. Other formatting tags include, without limitation, {TITLE} and {TITLE} for describing the title of the document, {P} and {/P} for indicating the beginning of a paragraph of text in the document, {BR} and {/BR} for indicating a line break in the text, {A REF} and {/A} indicating an anchor and hypertext reference for linking, {TABLE} and {/TABLE} for indicating a table, {TR} and {/TR} for a table row, {TD} and {/TD} indicating table data, {IMG SRC} for insucting the browser to display an image, {FONT COLOR} and {/FONT} to control the font color of given text, {B} and {/B} to bold given text, {INPUT TYPE} to identify an input means such as a checkbox, button, pulldown menu or the like, {FRAMESET} to define the parameters of one or more frames, {FRAME} and {/FRAME} to specify the contents of an individual frame, {MARGIN} to control the page margin, {ALIGN} and {/ALIGN} for aligning certain text on the page, {HSPACE} and {VSPACE} for inserting empty horizontal and vertical spaces, {EMBED SRC} to embed an image within a document, {LAYER} for inserting a layered object within a document (Netscape Navigator 4.0 or higher), and numerous others. Many of these tags are designed to be nested within each other to provide enhanced objects. Thus, for example, a clickable image can be created by placing an {IMG SRC } tag within a {A HREF} tag. The above list, of course, is merely exemplary, as HTML is an evolving language.

Figure 5:
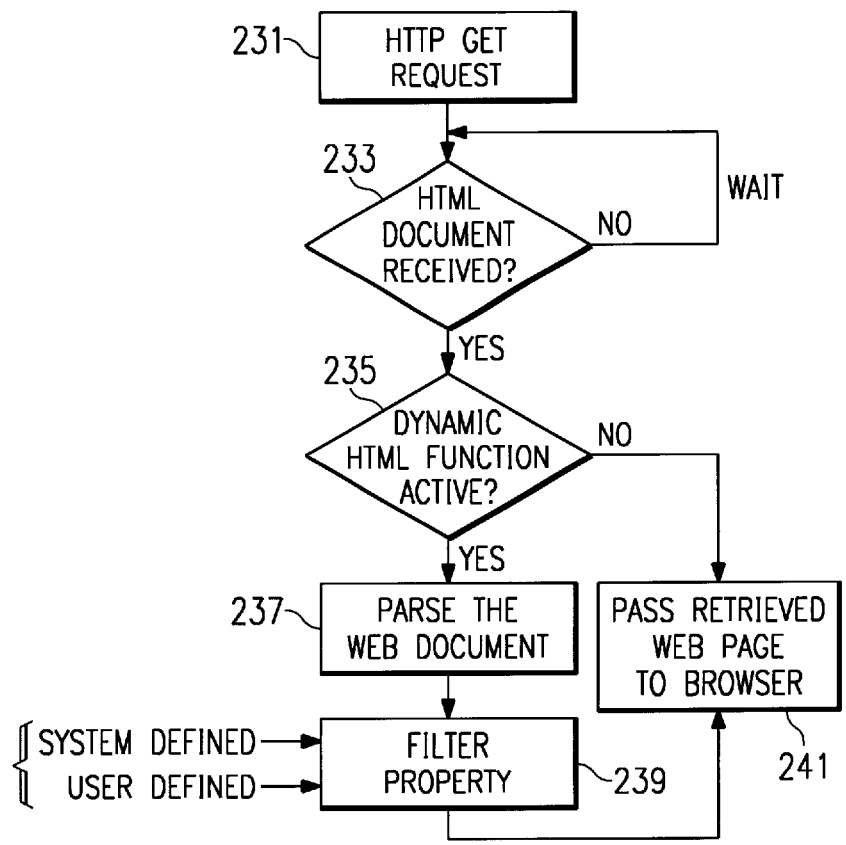
FIG. 5 is a flowchart of a preferred routine of the present invention for re-formatting a retrieved HTML document to thereby modify the appearance of the Web document on the browser.

According to the present invention, the caching proxy includes the filtering mechanism 229 for receiving a Web document formatted according to HTML, identifying the HTML tags (such as described above), re-formatting the Web document by modifying one or more characteristics of original HTML, and then passing the modified Web document to the browser for display. This operation is shown generally in the flowchart of FIG. 5. It begins at step 231 in response to a HTTP GET request that is sent over the computer network. At step 233, a test is made to determine whether the HTML document responsive to the HTTP GET request has been received from the network. If the outcome of the test at step 233 is negative, the routine cycles and waits for the document to arrive. If the outcome of the test at step 233 is positive, a test is made at step 235 to determine whether the "dynamic HTML" function is active. According to the present invention, the dynamic HTML function may be activated upon a given occurrence. Alternatively, the function may be selectively activated if the browser is used in conjunction with a Web appliance. The function may be activated for certain type(s) of Web documents or for certain information tag type(s) within a given Web document. Under certain circumstances, e.g., when it is desired to filter certain content. Of course, any combination of the above conditions may be used to determine when the function is active.

If the dynamic HTML function is not active, as indicated by a negative outcome of the test at step 235, the routine branches to step 241 and passes the retrieved Web document (un-modified) back to the browser. If, however, the dynamic HTML function is active, as indicated by a positive outcome of the test at step 235, the routine continues at step 237 to parse the Web document. Typically, this step involves identifying the HTML format and other information therein that may need to be supplemented, modified or otherwise changed to affect the appearance of the document on the browser. At step 239, the parsed information is applied through a filter to re-format the Web document according to a given filter property. An example of how the filter mechanism operates is set forth below. Typically, the filter property is defined by the system, although the given property may be defined by the user using the remote control. The routine then continues at step 241 to pass the Web document (as modified) to the browser. This completes the processing.

The parsing of the retrieved HTML and the associated filtering of that HTML may be effected automatically or under control of some user input. The proxy 225 thus provides control over the "look and feel" of the data received from the Web server. Thus, by way of example only, the caching proxy 225 is used to control foreground and background colors, to override font types and size, to control display geometry (e.g., space reservation on the display), to display other URLs within the current page, to add links, to modify links, to add or modify scripts, to embed sounds, animations, videos and/or other files, to add/remove/reconfigure frames on the page and/or to control text/table formatting. Other characteristics of the page may be modified as well, as the above are merely exemplary.

Figure 6:
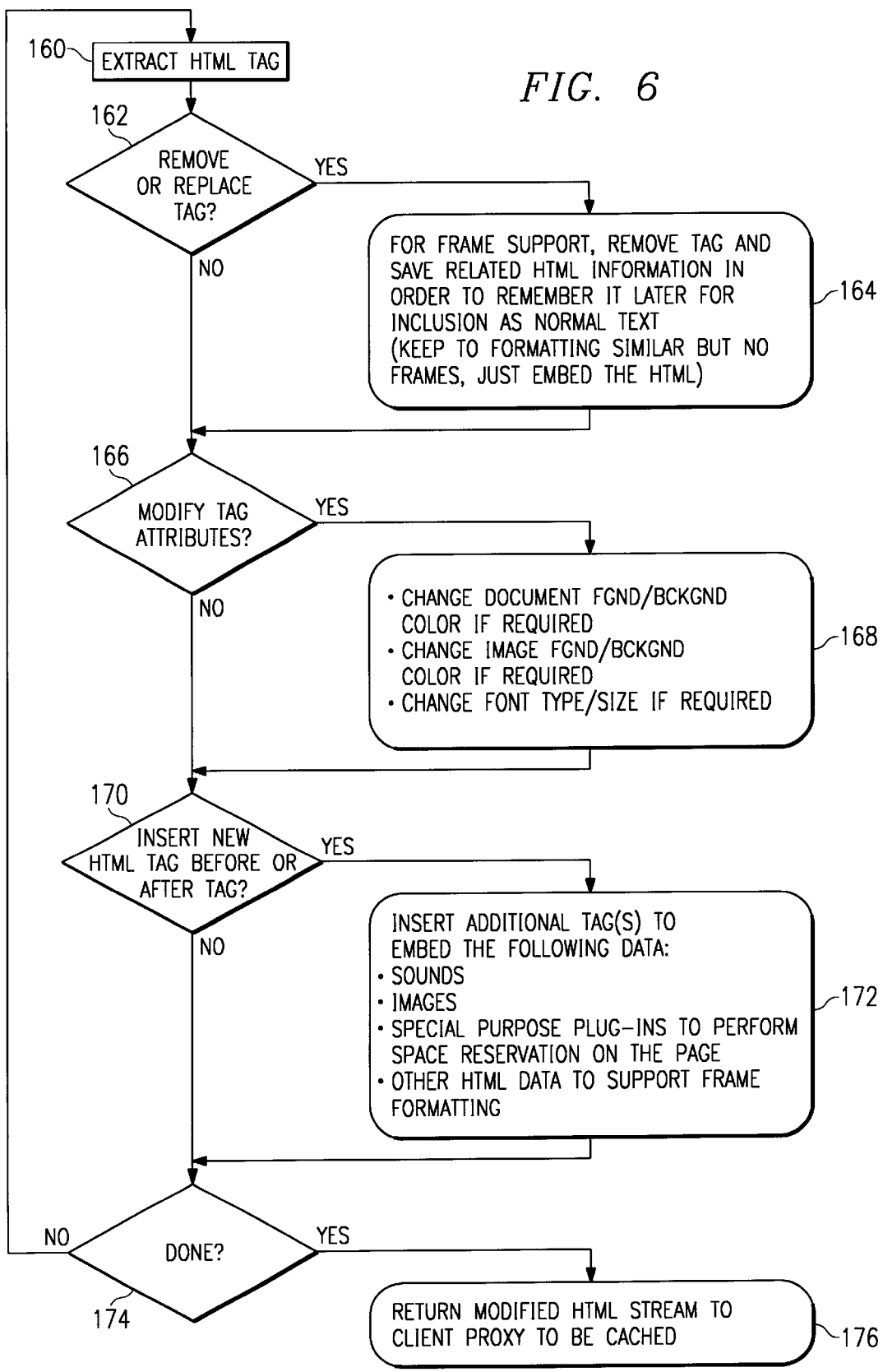
FIG. 6 is a detailed flowchart illustrating one preferred implementation of the filter property function of FIG. 5.

A generic implementation of the filter mechanism is illustrated in detail in the flowchart of FIG. 6. This routine begins at step 160 with the extraction of an HTML tag from the Web document being parsed. At step 162, a test is run to determine whether the tag is to be removed or replaced. An example of a situation where it may be desirable to remove a tag is when the user desires to do away with a "framed" document. This is especially desirable where the Web content is located on a television class display that may be located at a distance from where the viewer is seated. If the frames were not removed, the content within a particular frame might be too small in order to read at such a distance. By removing the FRAME and associated tags, the Web content may be simply and efficiently re-formatted and displayed (for example, in a given frame order). If the outcome of the test at step 162 is positive, the routine branches to step 164. Considering the above example, in step 164, the FRAME tag in the Web document is removed and the HTML associated with the frame is saved for inclusion as normal text in the HTML data stream. Of course, this particular example is merely for illustration purposes, as the type of action that takes place in step 164 will ultimately depend on the purpose that the given tag was removed at step 162.

Figure 8:
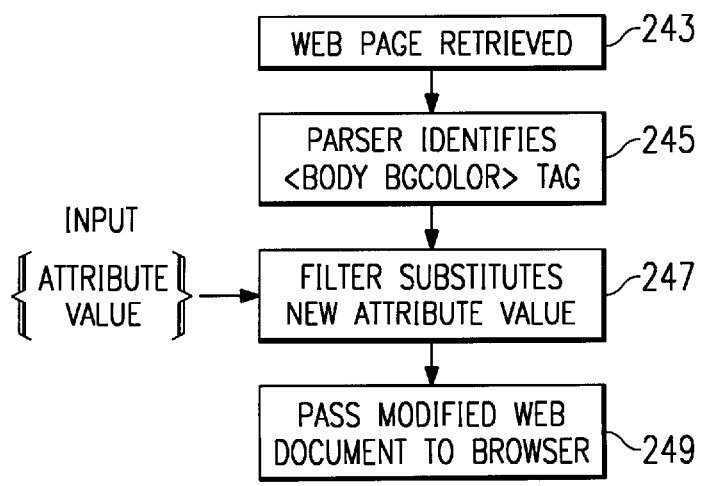
FIG. 8 is a flowchart illustrating how the proxy changes the background color of a Web document retrieved from a given server.

If the result of the test at step 162 is negative, or after step 164, a test is done at step 166 to determine whether it is desired to modify the attributes of the tag extracted at step 160. If the outcome of the test at step 166 is positive, the routine branches to step 168 wherein the action is taken. Thus, at step 168, the document foreground or background color may be changed (as illustrated in FIG. 8, for example), the color of a particular image may be changed, or the font type or size of certain text may be changed, and so forth. If the result of the test at step 166 is negative, or after step 168, the routine continues at step 170 to test whether a new HTML tag is to be inserted before or after the HTML tag extracted at step 160. If so, the routine branches to step 172. At step 172, the new tag may be inserted, for example, to embed one or more of the following types of data: sounds, images, special purpose plug-ins to perform space reservation on the page (as will described below), or other HTML data to support frame re-formatting.

If the result of the test at step 170 is negative, or after step 172, the routine continues by testing at step 174 whether the filtering process is complete. If not, the routine returns to step 160 and gets the next tag. If, however, the outcome of the test at step 174 is positive, the routine branches to step 176 to return the modified HTML stream to the client proxy to be cached. This completes the processing.

Figure 7:
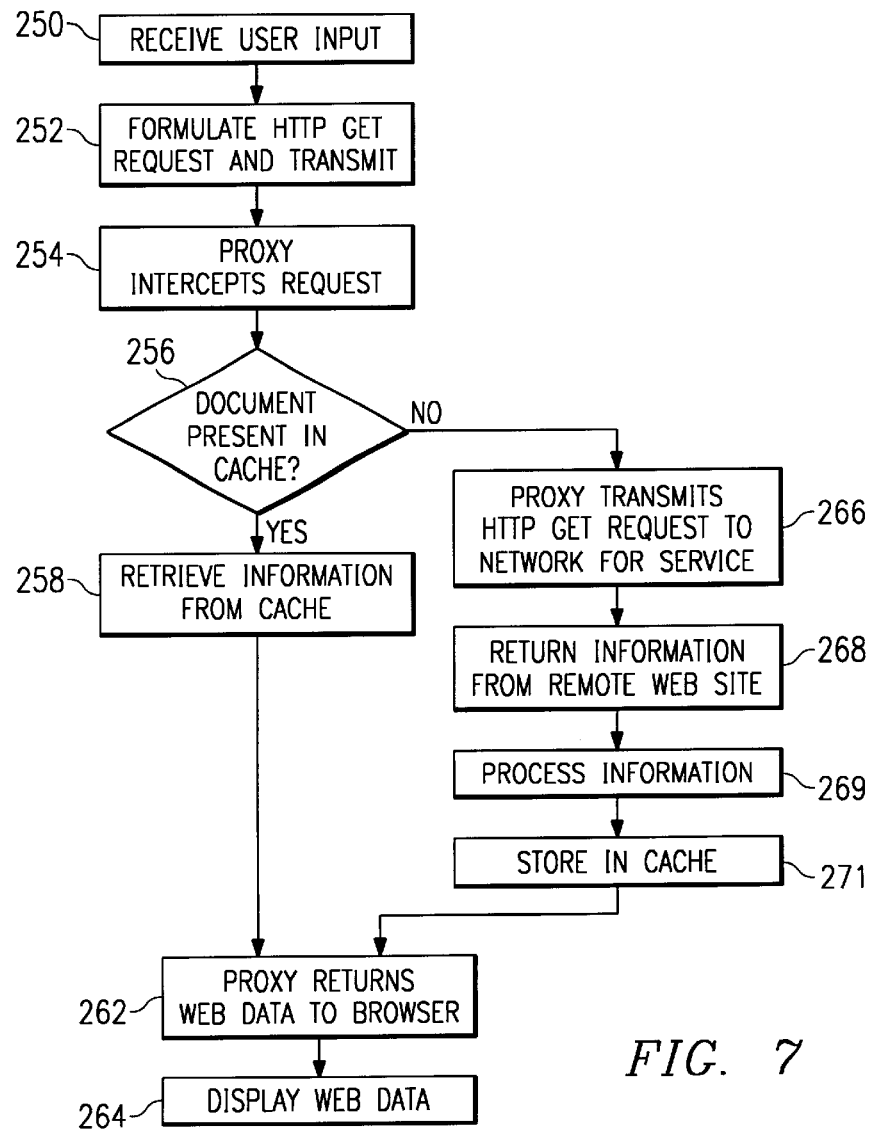
FIG. 7 is a detailed flowchart illustrating how the proxy interfaces between the client and the server to provide the dynamic HTML function.

Referring now to FIG. 7, a flowchart is shown of a more detailed operation of the present invention when an HTTP GET request is issued from the browser to the server. It is assumed as noted above that the proxy is configured on the client along with the associated cache. At step 250, the browser received some user input for Web data. For example, the user desires to obtain a Web page located on a server. This page may or may not already be present in the cache. At step 252, the browser formulates an HTTP GET request and transmits it using the sockets mechanism 231. At step 254, the HTTP GET request is "intercepted" by the proxy server 225. A test is then made at step 256 to determine whether the document requested is present in the cache 227 (or, alternatively, the browser cache). If the outcome of the test at step 256 is positive, then the routine continues at step 258 to retrieve the information from the cache. The retrieved information may be processed by the proxy to change or supplement how that information is displayed on the user interface. Thus, for example, the filter mechanism 229 may be used to change the font of the data, or to add sounds, or to arrange data in a certain tabular format, or the like, as previously described. At step 262, the routine returns the data (which may or may not have been modified, supplemented or adapted) back to the browser. The browser is not "aware" that the GET request has been serviced locally. The information is then displayed on the browser at step 264 and the routine terminates.

In the alternative, if the outcome of the test at step 256 is negative (e.g., because the document is not present or, if present, is outdated), then the routine branches to step 266 to transmit the HTTP request to the network. At step 268, the information requested is returned from the server 12 located on the network (instead of from the proxy via the cache). The routine then continues at step 269 to use the proxy 225 (and, in particular, the filtering mechanism 229) to modify the presentation of the information through the dynamic HTML function, as has been previously described. After the Web page has been modified, the modified page is preferably stored back in the cache at step 271 in order that it may be reused if and when the user desires to revisit the page at a subsequent time. After the modified Web page is stored in the cache, the routine continues at step 262 to return the Web data (as modified) to the browser. At step 264, the modified Web page is displayed on the browser.

Preferably, the proxy starts up when the Web appliance is booted up. Connectivity between the proxy and the browser is achieved using the sockets mechanism by configuring the browser to pass the HTTP requests to the proxy. To send an HTTP GET request, the browser creates a packet (including the URL and other information) and then opens a socket using the sockets mechanism. The packet is then sent to the IP address/port number to service the HTTP request. Thus, when the browser issues an HTTP GET request, it binds to the socket and sends the request. The request is then intercepted and processed by the proxy instead of being sent directly over the network, all in the manner previously described.

The proxy may be a piece of standalone or downloadable code that intercepts and filters the Web document retrieved over the computer network. The proxy is used to modify and/or process data before it is returned to the browser for display on the interface. This enables the data font or presentation to be modified, supplemented or otherwise adapted to the particular display environment. The proxy thus provides a useful tool to enhance the "look and feel" of data displayed on the browser and thus enables the user interface to be tailored to the Web appliance environment.

A simple example of the dynamic HTML function is shown in the flowchart of FIG. 8. In this example, it is assumed that it is desired to modify the background color of the Web page to be displayed on the browser from black "#000000" (R:000, G:000, B:000) to evergreen "#339999" (R:051, G:153, B:153). These characteristics, as noted above, are controlled (in the given Web page) by the BODY BGCOLOR tag and its associated numerical attribute. The routine begins at step 243 with the retrieval of the requested Web document. It is assumed that the dynamic HTML function is active for the particular request. At step 245, the parser identifies the BODY BGCOLOR tag. At step 247, the filter substitutes the new attribute value. (Of course, steps 245 and 247 may be carried out simultaneously). At step 249, the modified Web document (with the new BODY BGCOLOR tag attribute) is then passed to the browser for display.

A similar operation is performed for the filter properties previously described. Of course, it is envisioned that the filter will include a list of one or more "actions" that are to be effected with respect to the Web document, and this list may vary according to one or more given events or document types. Thus, for example, there may a first list that is used to alter the color of the document, a second list that is used to alter the alignment of text on the document, a third list that is used to alter the text spacing on the document, and so on. Alternatively, a particular list may include any number of different control actions to be carried out on the retrieved document. Other examples of HTML format modification are within the scope of one of ordinary skill. Thus, for example, if it is desired to omit scrollbars on the display, a SCROLL attribute is set to "NO," whenever this attribute is encountered in the HTML data stream that includes the Web document. If the user dislikes scrolling marquees, the LOOP=INFINITE attribute associate therewith can be replaced with LOOP=1 whenever the MARQUEE tag is encountered.

In one preferred embodiment, the present invention is implemented in "front" of a browser. As will be described below, however, certain functions provided by the present invention may also be implemented in a server-based system.

Figure 9:
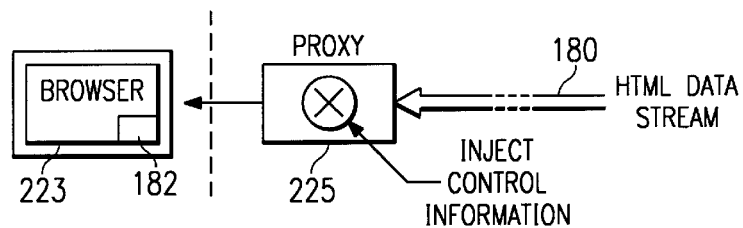
FIG. 9 is a representation of how the caching proxy/filter mechanism of the present invention intercepts a data stream prior to its delivery to the browser to thereby enable the mechanism to inject new formatting information.

FIG. 9 illustrates a basic operation of the proxy mechanism of the present invention to intercept the Web document and to inject certain control information into the data stream prior to initial delivery of the document to the browser. As seen in FIG. 9, the browser 223 sits on a given machine (e.g., a personal computer having its own display system, a computer system associated with a Web appliance having an associated television display, or the like). The data stream 180 received from the computer network includes the Web document embedded therein, and the Web document, as noted above, is formatted according to some markup language such as HTML. The received data stream 180 is intercepted by the proxy 225, which also functions to inject new control information into the data stream in order to affect how the Web content is ultimately displayed on the browser. One particular type of control information provides for the reservation of a given display area 182 on the display screen.

Figure 10:
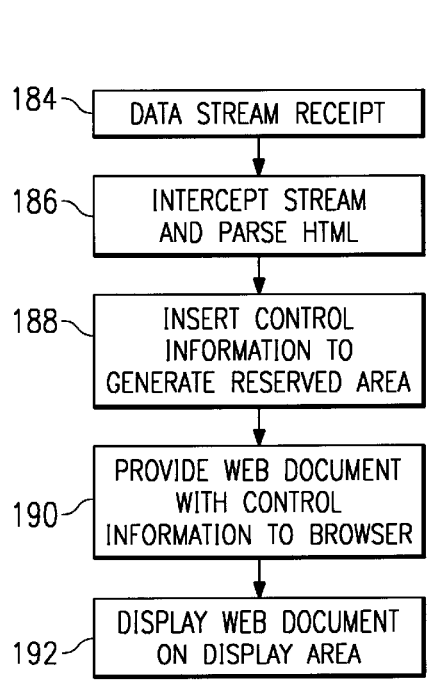
FIG. 10 is a flowchart describing a reservation area function provided by the present invention for reserving a display area on the television class monitor.

Referring now to FIG. 10, a flowchart is illustrated of a reservation area function that uses the display area 182 for displaying given content. Preferably, such content is not part of the Web document received by the machine, but rather is content provided by some alternate source, or generated by the client machine itself (e.g., a status message or the like). The method begins at step 184 as a data stream including the Web document is received from a server at which the document is supported. In the proxy server embodiment, the Web document may be supported on the server itself. At step 186, the stream is intercepted and parsed prior to its delivery to the browser to identify formatting information in the Web document. Thereafter, at step 188, certain control information is inserted into the data stream such that when the Web document is displayed on the browser, a portion of the display area thereof is reserved for display of given content. This was the portion 182 described above with respect to FIG. 9. Returning back to the flowchart of FIG. 10, at step 190, the Web document, together with the control information, are then forwarded to the browser. At step 192, the Web document (as modified) is then displayed on the display area.

The control information injected into the data stream preferably inhibits display of the Web document in the reserved display area. By this technique, the Web document, in effect, is re-flowed around the reserved area, thereby making space available for display of other content such as emergency messages, status messages, advertising, other pages, and the like.

One of ordinary skill will appreciate that the particular applications of the inventive technique are quite varied. It may be desirable to under certain circumstances for the appliance to "seize" a portion of the browser display area for the display of a so-called "display object" within the reservation area, as has been previously described. According to the present invention, a display object may be any text, graphic, animation, or other content (e.g., an emergency message, a text message, an advertisement or the like). The object inserted into the Web document may be an audio data stream. A display object, alternatively, may be a blank portion of the display screen. Thus, for example, the user may desire to blank out or otherwise obscure certain text or images (e.g., advertising banners). In such case, the display object in effect removes such content from the display screen. The above examples, however, are merely exemplary. Numerous other applications are within the scope of this invention.

It should be appreciated that the present invention enables a Web author to generate a single version of a Web page that may be displayed consistent across many different types of display system platforms. This is primarily because the proxy functions to intercept and re-format the Web document (or components thereof) and/or injects new control information for modifying how the document is displayed on the browser. This operation, in effect, masks out differences between various display system(s), browsers, operating systems, or the like. To facilitate this operation, it may be desirable for the proxy to include a "discovery" function that can be used (either by the system or the user, via one or more display panels) to determine the particular display characteristics or properties of the display system. Such information may then be used by the proxy to help "tailor" the particular Web document display accordingly to optimize "look and feel."

Figure 11:
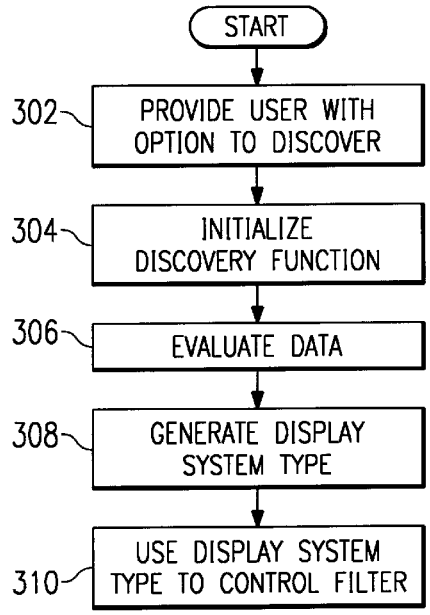
FIG. 11 is a flowchart of a method of discovery the particular Web content display characteristics of the display system on which the browser application is running.

One illustrative discovery method is now described with reference to the flowchart shown in FIG. 11. The routine begins at step 300 during an initialization process. At step 302, a user is given the option to discover the display system characteristics (e.g., the type of operating system, display resolution browser type, video display card characteristics, type of video driver, type of accelerator card, etc.). This function may be carried out by the existing operating system functions if such functions exist. At step 304, the discover function is initialized and the appropriate data retrieved. At step 306, the data is evaluated and, at step 308, the proxy associates the results with a particular display system type. Different display system types will be associated with the various display system configurations that may exist. At step 310, the particular display system type is used to provide input to the filter mechanism to thereby tailor the filter in an appropriate manner to achieve the desired display characteristics. If desired, the discover method may prompt the user to enter one or more display characteristics that are then applied to generate the display system type.

Figure 12:
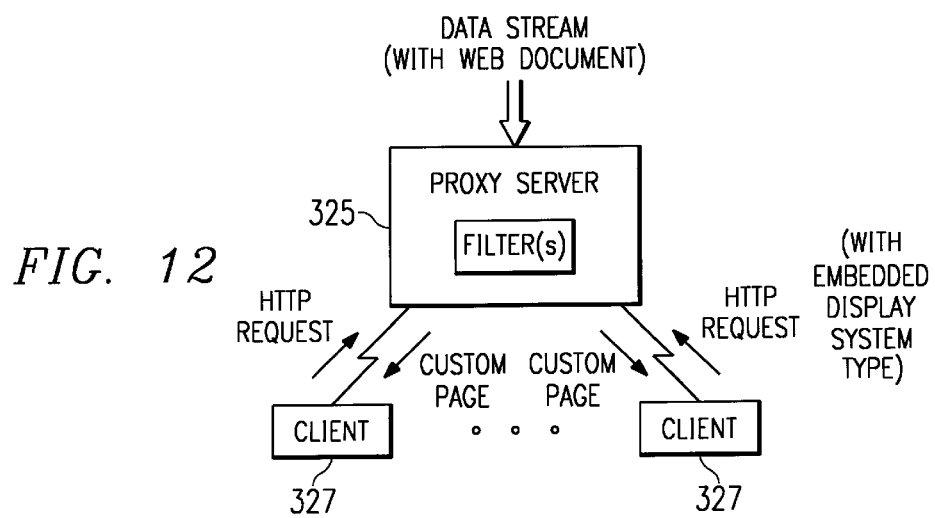
FIG. 12 is a block diagram of an alternative embodiment of the present invention wherein multiple client machines are connected to a proxy server that provides certain Web content modification functions.

The techniques of the present invention may be implemented in a proxy server. Thus, one or more of the above functions associated with the caching proxy may be incorporated in such a server within the scope of the present invention. Referring now to FIG. 12, a block diagram of one such system is shown. The system includes a proxy server 325 to which a plurality of client machines 327 connect. The proxy server may be a dedicated server (e.g., a server located at an Internet Service Provider), or a server located at a particular Web site. One or more of the client machines 327 may have different display system characteristics as has been previously described. In such case, one or more of such client machines may use the discovery process (as described above in the flowchart of FIG. 11) or some other means to determine their "display system type." Such information may then be provided to the proxy server 325 (e.g., via a CGI scripting technique or the like) so that the proxy server may then customize the data stream provided to the particular client(s). In particular, proxy server 325 will include a "master" filter mechanism that can be adjusted (for a given client) depending on the particular display system type associated with the client. One of ordinary skill will appreciate that such a system provides numerous advantages over conventional Web appliance implementations wherein each client receives the same content (and in the same format) irrespective of the display system type. The system shown in FIG. 12 provides for customized display information (according to the teachings herein) provided to one or more of the clients.

One of the preferred implementations of the client side or server side proxy of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Internet client" should be broadly construed to mean any computer or component thereof directly or indirectly connected or connectable in any known or later-developed manner to a computer network, such as the Internet. The term "Internet server" should also be broadly construed to mean a computer, computer platform, an adjunct to a computer or platform, or any component thereof. Of course, a "client" should be broadly construed to mean one who requests or gets the file, and "server" is the entity which downloads the file. Moreover, although the present invention is described in the context of the Hypertext Markup Language (HTML), those of ordinary skill in the art will appreciate that the HTTP caching proxy may also be used to reformat Web documents or other such objects formatted according to alternative markup languages including, without limitation, SGML (Standard Generalized Markup Language) and XML (Extended Markup Language).

Having thus described our invention, what we claim as new and desire to secure by letters patent is set forth in the following claims:

What is claimed is:

1. A method of controlling presentation on a client of a Web document formatted according to a markup language and supported on a server, the client including a browser and connectable to the server via a computer network, the method comprising the steps of:

as the Web document is received on the client, parsing the Web document to identify formatting information;

altering the formatting information to modify at least one display characteristic of the Web document; and passing the Web document to the browser for display.

2. The method of controlling presentation as described in claim 1 further including the step of displaying the Web document with the modified display characteristic on the browser.

3. The method of controlling presentation as described in claim 1 wherein the modified display characteristic is a background color.

4. The method of controlling presentation as described in claim 1 wherein the modified display characteristic is a font color.

5. The method of controlling presentation as described in claim 1 wherein the modified display characteristic is a spacing of text.

6. The method of controlling presentation as described in claim 1 wherein the modified display characteristic is a modified frame of a frame set.

7. The method of controlling presentation as described in claim 1 wherein the modified display characteristic is a portion of a page layout.

8. The method of controlling presentation as described in claim 1 wherein the modified display characteristic is a table format.

9. The method of controlling presentation as described in claim 1 wherein the formatting information is modified upon a given event.

10. The method of controlling presentation as described in claim 9 further including the step of embedding a display object in the Web document.

11. The method of controlling presentation as described in claim 1 wherein the markup language is Hypertext Markup Language (HTML).

12. A method of controlling presentation on a client of a Web document formatted according to hypertext markup language (HTML) and supported on a server, the client including a browser and connectable to the server via a computer network, the method comprising the steps of:

as the Web document is received on the client, parsing the Web document to identify HTML formatting information;

altering at least one characteristic of the HTML formatting information to create a modified Web document;

passing the modified Web document to the browser; and displaying the modified Web document.

13. The method of controlling presentation as described in claim 12 wherein the step of altering at least one characteristic of the HTML formatting information includes modifying information associated with an HTML markup tag selected from the group of HTML markup tags consisting essentially of: BODY, TITLE, H, P, BR, FONT, A HREF, IMG SRC, FRAMESET, FRAME, FRAME SRC, TABLE, TR, TD, FORM INPUT, ALIGN, MARGIN, HSPACE, VSPACE, EMBED, and LAYER.

14. The method of controlling presentation as described in claim 12 wherein the modified Web document includes a display object.

15. The method of controlling presentation as described in claim 14 wherein the display object is a dedicated area of the modified Web document on the browser.

16. The method of controlling presentation as described in claim 15 wherein the display object displays content in the dedicated area.

17. The method of controlling presentation as described in claim 16 wherein the content is a message.

18. The method as described in claim 12 wherein the computer network is the Internet and the client is a Web appliance.

19. A computer program product in computer-readable media for use in controlling presentation on a client of a Web document formatted according to a markup language (HTML) and supported on a server, the client including a browser and connectable to the server via a computer network, the computer program product comprising:

means for parsing the Web document as the Web document is received on the client to identify markup language formatting information;

means responsive to the parsing means for altering at least one characteristic of the formatting information to create a modified Web document; and means responsive to the altering means for passing the modified Web document for display on the browser.

20. The computer program product as described in claim 19 wherein the markup language is HTML and the means for altering modifies information associated with an HTML markup tag selected from the group of HTML markup tags consisting essentially of: BODY, TITLE, H, P, BR, FONT, A HREF, IMG SRC, FRAMESET, FRAME, FRAME SRC, TABLE, TR, TD, FORM INPUT, ALIGN, MARGIN, HSPACE, VSPACE, EMBED, and LAYER.

21. The computer program product as described in claim 19 further including a means for caching control information for controlling the parsing means.

22. The computer program product as described in claim 19 wherein the computer network is the Internet and the client is a Web appliance.

23. A client computer connectable to the Internet, comprising:
   a processor having an operating system;
   a browser application run by the operating system;
   a proxy having a cache associated therewith and including:
      means for parsing the Web document as the Web document is received by the proxy to identify markup language formatting information;
      means responsive to the parsing means for re-formatting the Web document; and
      means responsive to the re-formatting means for delivering the Web document to the browser.

24. The computer as described in claim 23 wherein the markup language is HTML and the means for altering modifies information associated with an HTML markup tag selected from the group of HTML markup tags consisting essentially of:BODY, TITLE, H, P, BR, FONT, A HREF, IMG SRC, FRAMESET, FRAME, FRAME SRC, TABLE, TR, TD, FORM INPUT, ALIGN, MARGIN, HSPACE, VSPACE, EMBED, and LAYER.

25. A method of displaying a Web document on a Web browser on a client, the Web document formatted according to a markup language and supported on a Web server, the method comprising the steps of:
   as the Web document is received on the client, parsing the Web document to identify formatting information;
   re-formatting the Web document in accordance with at least one filter property defined by a use of the client;
   transmitting the re-formatted Web document to the Web browser; and
   display the re-formatted Web document using the browser.

26. The method of displaying a Web document as described in claim 25 wherein the markup language is Hypertext Markup Language (HTML).

27. The method of displaying a Web document as described in claim 26 wherein the step of re-formatting the Web document is effected using information stored in a cache.

28. A method of controlling presentation on a Web apparatus of a Web document formatted according to a markup language and supported on a server, the Web apparatus including a browser having a display area, the method comprising the steps of:
   as a data stream comprising the Web document is received by the web apparatus, parsing the data stream to identify formatting information in the Web document;
   inserting control information into the data stream such that when the Web document is displayed on the browser, a portion of the display area is reserved for display of given content; and
   using the browser to display the Web document on the display area, wherein the control information inhibits display of the Web document in the portion of the display area reserved for display of the given content.

29. The method of controlling presentation as described in claim 28 further including the step of displaying given content in the portion of the display area.

30. The method of controlling presentation as described in claim 29 wherein the given content includes a message.

31. A method of controlling presentation on a Web client of a Web document formatted according to a markup language and supported on a server, the Web client having a browser, the method comprising the steps of:
   discovering a display system type associated with the Web apparatus, the display system type defined at least in part by display characteristics of the browser;
   as a data stream comprising the Web document is received on the Web client, parsing the data stream to identify formatting information in the Web documents; and
   inserting control information into the data stream to reformat the Web document for optimal display on the browser, wherein the control information is selected based on the discovered display system type.

* * * * *

UNITED STATES PATENT AND TRADEMARK OFFICE
CERTIFICATE OF CORRECTION

PATENT NO. : 6,886,013 B1
APPLICATION NO. : 08/927660
DATED : April 26, 2005
INVENTOR(S) : Michael J. Beranek et al.

Page 1 of 1

It is certified that error appears in the above-identified patent and that said Letters Patent is hereby corrected as shown below:

Title page

(12) delete "Beranek", and insert --Beranek et al.--.

(75) Inventorship, after "Michael J. Beranek", please insert --Christian Lita, Austin, Texas (US)--.

Signed and Sealed this
Twenty-ninth Day of December, 2015

Michelle K. Lee
*Director of the United States Patent and Trademark Office*